United States Patent
Luo

(10) Patent No.: US 10,489,602 B2
(45) Date of Patent: Nov. 26, 2019

(54) DATA TRANSMISSION METHOD, APPARATUS, AND SYSTEM

(71) Applicant: Yulong Computer Telecommunication Scientific (Shenzhen) Co., Ltd., Shenzhen, Guangdong (CN)

(72) Inventor: Limin Luo, Guangdong (CN)

(73) Assignee: Yulong Computer Telecommunication Scientific (Shenzhen) Co., Ltd., Shenzhen (CN)

(*) Notice: Subject to any disclaimer, the term of this patent is extended or adjusted under 35 U.S.C. 154(b) by 501 days.

(21) Appl. No.: 15/468,345

(22) Filed: Mar. 24, 2017

(65) Prior Publication Data

US 2017/0193242 A1 Jul. 6, 2017

Related U.S. Application Data

(63) Continuation-in-part of application No. PCT/CN2014/090092, filed on Oct. 31, 2014.

(30) Foreign Application Priority Data

Sep. 26, 2014 (CN) .......................... 2014 1 0505903

(51) Int. Cl.
*G06F 21/60* (2013.01)
*H04W 76/11* (2018.01)
(Continued)

(52) U.S. Cl.
CPC .......... *G06F 21/606* (2013.01); *H04W 12/06* (2013.01); *H04W 76/11* (2018.02); *H04L 63/105* (2013.01)

(58) Field of Classification Search
CPC ...... H04L 29/08; H04L 63/105; H04W 76/11; H04W 12/06; G06F 21/606
(Continued)

(56) References Cited

U.S. PATENT DOCUMENTS

2004/0003013 A1\* 1/2004 Coulthard ........... H04L 67/2823
2005/0273708 A1\* 12/2005 Motyka ............... G06F 17/2217
715/209

(Continued)

FOREIGN PATENT DOCUMENTS

CN 102202075 A 9/2011
CN 103618736 A 3/2014

*Primary Examiner* — Kambiz Zand
*Assistant Examiner* — Benjamin A Kaplan
(74) *Attorney, Agent, or Firm* — Young Basile Hanlon & MacFarlane, P.C.

(57) ABSTRACT

A data transmission method and a terminal include multiple operating systems, and each operating system corresponds to a transmission module. The terminal determines a target transmission mode for data of the terminal when a data transmission command for transmitting the data of the terminal to a target terminal is received, and the target transmission mode includes a normal transmission mode and a secure transmission mode. The terminal switches to a designated operating system of the multiple operating systems when the target transmission mode is the secure transmission mode, establishes a connection with the target terminal via the designated operating system, determines whether the target terminal supports secure transmission, and transmits the data to the target terminal via the secure transmission mode when the determination result is that the target terminal supports the secure transmission.

15 Claims, 5 Drawing Sheets

(51) Int. Cl.
*H04W 12/06* (2009.01)
*H04L 29/06* (2006.01)

(58) Field of Classification Search
USPC .......................................................... 726/26
See application file for complete search history.

(56) References Cited

U.S. PATENT DOCUMENTS

| | | | |
|---|---|---|---|
| 2009/0254891 A1* | 10/2009 | Cui | .......................... G06F 8/53 |
| | | | 717/138 |
| 2013/0018977 A1* | 1/2013 | Peng | ....................... H04L 67/06 |
| | | | 709/213 |
| 2013/0191457 A1 | 7/2013 | Horsman et al. | |

* cited by examiner

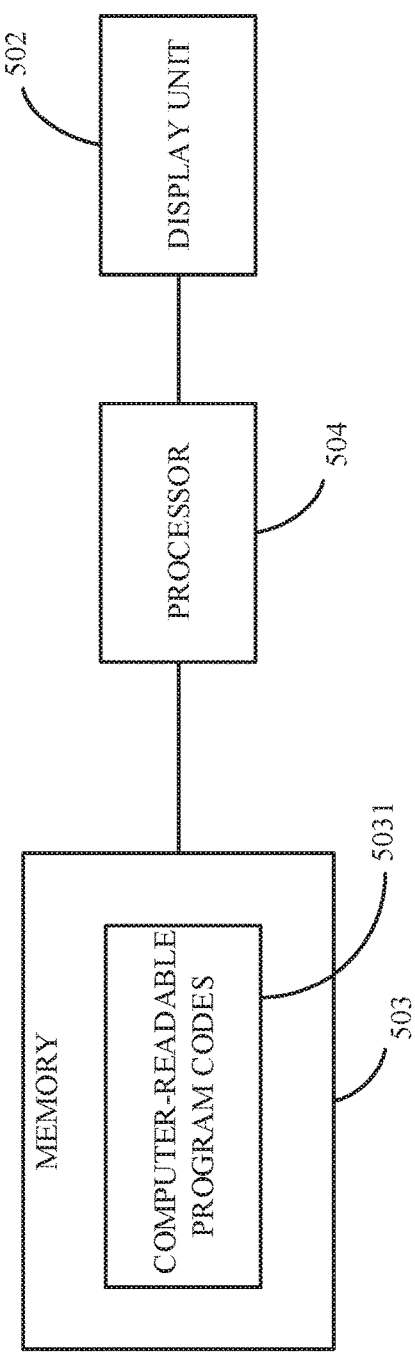

DATA TRANSMISSION METHOD, APPARATUS, AND SYSTEM

CROSS-REFERENCE TO RELATED APPLICATION(S)

This application is a continuation in part of international Patent Application PCT No. PCT/CN2014/090092, filed on Oct. 31, 2014, which claims priority to Chinese Patent Application No. 201410505903.5, filed on Sep. 26, 2014, contents of all of which are hereby incorporated by reference in their entireties.

TECHNICAL FIELD

The present disclosure relates to the technical field of terminals, and in particular, to a data transmission method, a data transmission device, and a data transmission system.

BACKGROUND

Presently, when mobile phone terminals share data, a connection is directly established between a transmitter and a receiver, and the transmitter directly transmits data to the receiver. The transmitter cannot determine whether the reception environment of the receiver is secure, which may result in a risk of stealing and eavesdropping after content is received.

Therefore, what is needed is a new technical solution, which can ensure security of shared data when the transmitter and the receiver share data, and prevent the problem that the shared data is stolen or eavesdropped after the receiver receives the shared data.

SUMMARY

Based on the above problems, the present disclosure provides a new technical solution, which can ensure security of shared data when a transmitter and a receiver share data, and prevent the problem that the shared data is stolen or eavesdropped after the receiver receives the shared data.

In view of the above, the present disclosure provides a data transmission method which is applied in a terminal. The terminal includes multiple operating systems, wherein each operating system corresponds to a transmission module. The method includes: determining a target transmission mode for data of the terminal when a data transmission command for transmitting the data of the terminal to a target terminal is received, wherein the target transmission mode includes a normal transmission mode and a secure transmission mode; switching from the current operating system of the terminal to a designated operating system of the multiple operating systems when the target transmission mode is the secure transmission mode, and establishing a connection with the target terminal via the designated operating system; determining whether the target terminal supports secure transmission; transmitting the data to the target terminal via the secure transmission mode when the determination result is that the target terminal supports the secure transmission.

In the technical solution, when a user of the terminal wants the data to be securely transmitted, the secure transmission mode can be selected. When the terminal detects that the transmission mode for the data is the secure transmission, and the current operating system is not the designated operating system, the user is prompted to switch to the designated operating system or the terminal automatically switches to the designated operating system. Specifically, the designated operating system can be a secure operating system. A connection with the target terminal of the receiver is then established, and whether the target terminal supports the secure transmission is determined, that is, whether the target terminal includes a secure operating system or a secure transmission module is determined. When the determination result is yes, the data is transmitted to the target terminal via the secure transmission mode, thereby ensuring data security during data transmission and after the data is transmitted to the target terminal.

In the above technical solution, preferably, the method further includes prompting the user of the terminal to terminate the transmission of the data or adopt the normal transmission mode to transmit the data to the target terminal when the determination result is that the target terminal does not support the secure transmission.

In the technical solution, when the target terminal does not support the secure transmission, for ensuring security of transmission of the data, the user is prompted to terminate the transmission of the data, or to adopt the normal transmission mode to directly transmit the data.

In the above technical solution, preferably, determining whether the target terminal supports the secure transmission includes: sending a transmission environment check command to the target terminal, so as to cause the target terminal to check whether a corresponding designated operating system is included according to the transmission environment check command, and send a support response to the terminal when the determination result is yes; and determining whether the support response is received from the target terminal, determining that the target terminal supports the secure transmission when the determination result is yes, and determining that the target terminal does not support the secure transmission when the determination result is no.

In the technical solution, the terminal of the transmitter sends the transmission environment check command to the target terminal of the receiver, and the target terminal determines whether the designated operating system is included according to the command, that is, whether the secure operating system is included. The target terminal sends the support response when the designated operating system is included, so as to inform the terminal of the transmitter that the secure transmission can be performed.

In the above technical solution, preferably, transmitting the data to the target terminal via the secure transmission mode includes: establishing a connection between a first transmission module corresponding to the designated operating system of the terminal and a second transmission module corresponding to the designated operating system of the target terminal, and transmitting the data from the first transmission module to the second transmission module.

In the technical solution, when the data can be transmitted via the secure transmission mode, it indicates that the terminal of the transmitter has the designated operating system and the transmission module corresponding to the designated operating system, and the terminal of the receiver has the designated operating system and the transmission module corresponding to the designated operating system. At this point, a transmission channel is established between the two transmission modules, thereby ensuring security of transmission of the data.

Specifically, data transmission can be directly performed between the designated operating system for example the secure operating system and a designated operating system of the other terminal, for example, data is directly transmitted from a secure operating system of a terminal A to a secure operating system of a terminal B.

Furthermore, for ensuring security of the data of the terminal, the secure operating system may not be allowed to directly communicate with external devices to perform data service. At this point, when data transmission is performed, the data of the secure operating system can be transmitted to the other normal operating system of the terminal, and the data is then transmitted from the other normal operating system of the terminal to a normal operating system of an external target terminal, and then the data is transmitted from the normal operating system to a designated operating system, that is, a secure operating system.

For further ensuring security of data, encryption processing can be performed on transmission of the data. After the target terminal of the receiver receives the data, decryption processing is performed.

In the above technical solution, preferably, the designated operating system is the operating system of the multiple operating systems having the highest security level.

In the technical solution, the operating system having the highest security level, that is, the secure operating system is set to be the designated operating system, thus the security of data transmission and data storage can be ensured.

According to another aspect of the present disclosure, a data transmission device is further provided. The data transmission device is applied in a terminal. The terminal includes multiple operating systems, wherein each operating system corresponds to a transmission module. The data transmission device includes: a determining unit configured to determine a target transmission mode for data of the terminal when a data transmission command for transmitting the data of the terminal to a target terminal is received, wherein the target transmission mode includes a normal transmission mode and a secure transmission mode. The device further includes a connection establishing unit configured to switch from the current operating system of the terminal to a designated operating system of the multiple operating systems when the target transmission mode is the secure transmission mode, and establish a connection with the target terminal via the designated operating system, a judging unit configured to determine whether the target terminal supports secure transmission, and a transmitting unit configured to transmit the data to the target terminal via the secure transmission mode when the determination result is that the target terminal supports the secure transmission.

In the technical solution, when a user of the terminal wants the data to be securely transmitted, the secure transmission mode can be selected. When the terminal detects that the transmission mode for the data is the secure transmission, and the current operating system is not the designated operating system, the user is prompted to switch to the designated operating system or the terminal automatically switches to the designated operating system. Specifically, the designated operating system can be a secure operating system. A connection with the target terminal of the receiver is then established, and whether the target terminal supports the secure transmission is determined, that is, whether the target terminal includes a secure operating system or a secure transmission module is determined. When the determination result is yes, the data is transmitted to the target terminal via the secure transmission mode, thereby ensuring data security during data transmission and after the data is transmitted to the target terminal.

In the above technical solution, preferably, the device further includes a prompting unit configured to prompt the user of the terminal to terminate the transmission of the data or adopt the normal transmission mode to transmit the data to the target terminal when the determination result is that the target terminal does not support the secure transmission.

In the technical solution, when the target terminal does not support the secure transmission, for ensuring security of transmission of the data, the user is prompted to terminate the transmission of the data, or to adopt the normal transmission mode to directly transmit the data.

In the above technical solution, preferably, the judging unit includes a sending unit configured to send a transmission environment check command to the target terminal, so as to cause the target terminal to check whether a corresponding designated operating system is included according to the transmission environment check command, and send a support response to the terminal when the determination result is yes, and a deciding unit configured to determine whether the support response is received from the target terminal, determine that the target terminal supports the secure transmission when the determination result is yes, and determine that the target terminal does not support the secure transmission when the determination result is no.

In the technical solution, the terminal of the transmitter sends the transmission environment check command to the target terminal of the receiver, and the target terminal determines whether the designated operating system is included according to the command, that is, whether the secure operating system is included. The target terminal also sends the support response when the designated operating system is included, so as to inform the terminal of the transmitter that secure transmission can be performed.

In the above technical solution, preferably, the transmitting unit is configured to establish a connection between a first transmission module corresponding to the designated operating system of the terminal and a second transmission module corresponding to the designated operating system of the target terminal, and transmit the data from the first transmission module to the second transmission module.

In the technical solution, when the data can be transmitted via the secure transmission mode, it indicates that the terminal of the transmitter has the designated operating system and the transmission module corresponding to the designated operating system, and the terminal of the receiver has the designated operating system and the transmission module corresponding to the designated operating system. At this point, a transmission channel is established between the two transmission modules, thereby ensuring security of transmission of the data.

Specifically, data transmission can be directly performed between the designated operating system for example the secure operating system and a designated operating system of the other terminal, for example, data is directly transmitted from a secure operating system of a terminal A to a secure operating system of a terminal B.

Furthermore, for ensuring security of the data of the terminal, the secure operating system may not be allowed to directly communicate with external devices to perform data service. At this point, when data transmission is performed, the data of the secure operating system can be transmitted to the other normal operating system of the terminal, and the data is then transmitted from the other normal operating system of the terminal to a normal operating system of an external target terminal, and then the data is transmitted from the normal operating system to a designated operating system, that is, a secure operating system.

For further ensuring security of the data, encryption processing can be performed on transmission of the data. After the target terminal of the receiver receives the data, decryption processing is performed.

In the above technical solution, preferably, the designated operating system is the operating system of the multiple operating systems having the highest security level.

In the technical solution, the operating system having the highest security level, that is, the secure operating system is set to be the designated operating system, thus the security of data transmission and data storage can be ensured.

According to another implementation of the present disclosure, a data transmission system is further provided, and the data transmission system includes the data transmission device of any of the above technical solutions.

By means of the above technical solution, secure transmission and storage of user secure data can be ensured, and malicious attacks from other operating systems can be avoided.

BRIEF DESCRIPTION OF THE DRAWINGS

FIG. 5 is a diagrammatic view of a terminal in accordance with an implementation of the present disclosure.

DETAILED DESCRIPTION

To understand the above-mentioned purposes, features and advantages of the present disclosure more clearly, the present disclosure will be further described in detail below in combination with the accompanying drawings and the specific implementations. It should be noted that, the implementations of the present application and the features in the implementations may be combined with one another without conflicts.

Many specific details will be described below for sufficiently understanding the present disclosure. However, the present disclosure may also be implemented by adopting other manners different from those described herein. Accordingly, the protection scope of the present disclosure is not limited by the specific implementations disclosed below.

Figure 1:
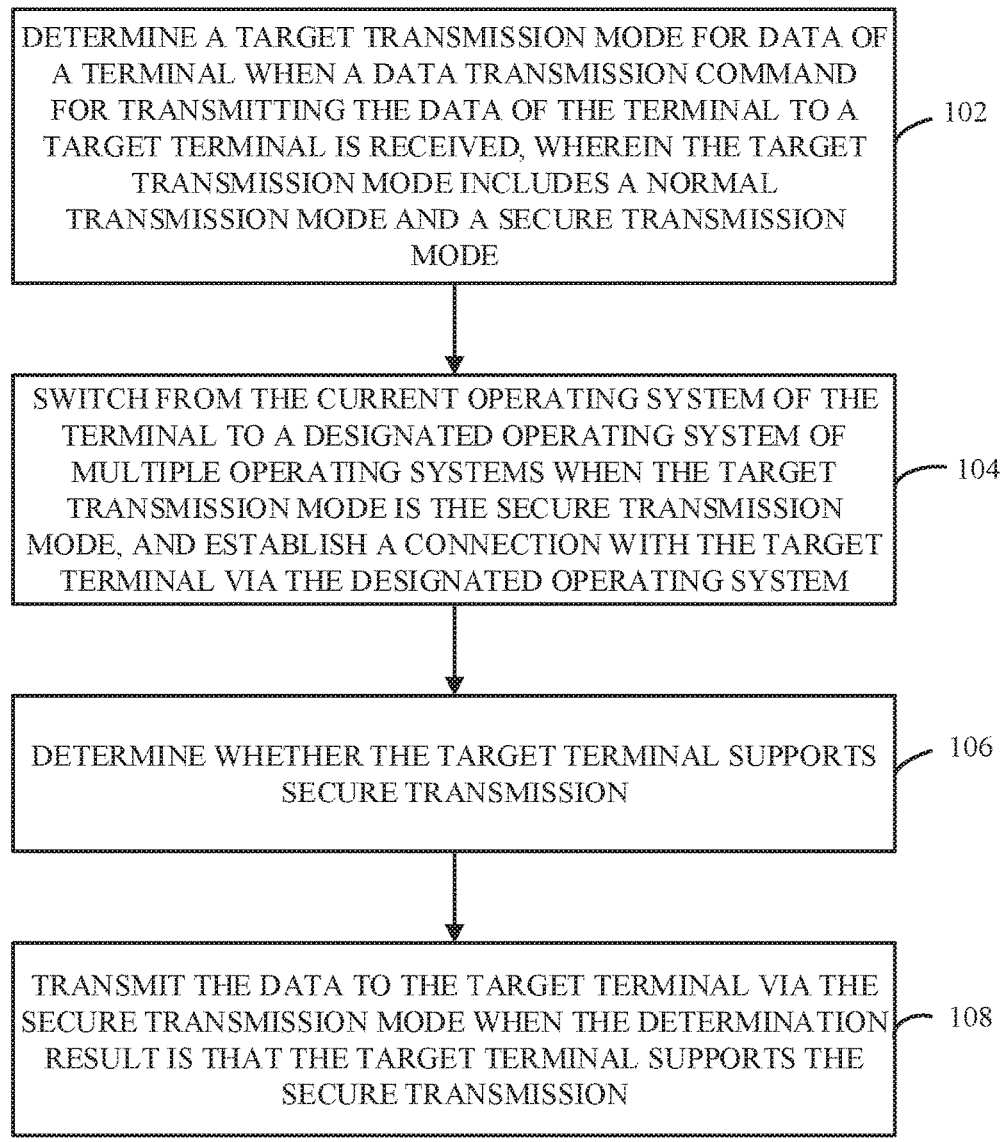
FIG. 1 is a flow chart of a data transmission method in accordance with an implementation of the present disclosure.

FIG. 1 is a flow chart of a data transmission method in accordance with an implementation of the present disclosure.

As illustrated by FIG. 1, a data transmission method in accordance with an implementation of the present disclosure includes: step 102, determining a target transmission mode for data of a terminal when a data transmission command for transmitting the data of the terminal to a target terminal is received, wherein the target transmission mode includes a normal transmission mode and a secure transmission mode; step 104, switching from the current operating system of the terminal to a designated operating system of multiple operating systems when the target transmission mode is the secure transmission mode, and establishing a connection with the target terminal via the designated operating system; step 106, determining whether the target terminal supports secure transmission; step 108, transmitting the data to the target terminal via the secure transmission mode when the determination result is that the target terminal supports the secure transmission.

In the technical solution, when a user of the terminal wants the data to be securely transmitted, the secure transmission mode can be selected. When the terminal detects that the transmission mode for the data is the secure transmission, and the current operating system is not the designated operating system, the user is prompted to switch to the designated operating system or the terminal automatically switches to the designated operating system. Specifically, the designated operating system can be a secure operating system. A connection with the target terminal of the receiver is then established, and whether the target terminal supports the secure transmission is determined, that is, whether the target terminal includes a secure operating system or a secure transmission module is determined. When the determination result is yes, the data is transmitted to the target terminal via the secure transmission mode, thereby ensuring data security during data transmission and after the data is transmitted to the target terminal.

In the above technical solution, preferably, the method further includes prompting the user of the terminal to terminate the transmission of the data or adopt the normal transmission mode to transmit the data to the target terminal when the determination result is that the target terminal does not support the secure transmission.

In the technical solution, when the target terminal does not support the secure transmission, for ensuring security of transmission of the data, the user is prompted to terminate the transmission of the data, or to adopt the normal transmission mode to directly transmit the data.

In the above technical solution, preferably, determining whether the target terminal supports the secure transmission includes: sending a transmission environment check command to the target terminal, so as to cause the target terminal to check whether a corresponding designated operating system is included according to the transmission environment check command, and send a support response to the terminal when the determination result is yes; and determining whether the support response is received from the target terminal, determining that the target terminal supports the secure transmission when the determination result is yes, and determining that the target terminal does not support the secure transmission when the determination result is no.

In the technical solution, the terminal of the transmitter sends the transmission environment check command to the target terminal of the receiver, and the target terminal determines whether the designated operating system is included according to the command, that is, whether the secure operating system is included. The target terminal sends the support response when the designated operating system is included, so as to inform the terminal of the transmitter that the secure transmission can be performed.

In the above technical solution, preferably, transmitting the data to the target terminal via the secure transmission mode includes: establishing a connection between a first transmission module corresponding to the designated operating system of the terminal and a second transmission module corresponding to the designated operating system of the target terminal, and transmitting the data from the first transmission module to the second transmission module.

In the technical solution, when the data can be transmitted via the secure transmission mode, it indicates that the terminal of the transmitter has the designated operating system and the transmission module corresponding to the designated operating system, and the terminal of the receiver has the designated operating system and the transmission module corresponding to the designated operating system. At this point, a transmission channel is established between the two transmission modules, thereby ensuring security of transmission of the data.

Specifically, data transmission can be directly performed between the designated operating system for example the secure operating system and a designated operating system of the other terminal, for example, data is directly transmitted from a secure operating system of a terminal A to a secure operating system of a terminal B.

Furthermore, for ensuring security of the data of the terminal, the secure operating system may not be allowed to directly communicate with external devices to perform data service. At this point, when data transmission is performed, the data of the secure operating system can be transmitted to the other normal operating system of the terminal, and the data is then transmitted from the other normal operating system of the terminal to a normal operating system of an external target terminal, and then the data is transmitted from the normal operating system to a designated operating system, that is, a secure operating system.

For further ensuring security of the data, encryption processing can be performed on transmission of the data. After the target terminal of the receiver receives the data, decryption processing is performed.

In the above technical solution, preferably, the designated operating system is the operating system of the multiple operating systems having the highest security level.

In the technical solution, the operating system having the highest security level, that is, the secure operating system is set to be the designated operating system, thus the security of data transmission and data storage can be ensured.

Figure 2:
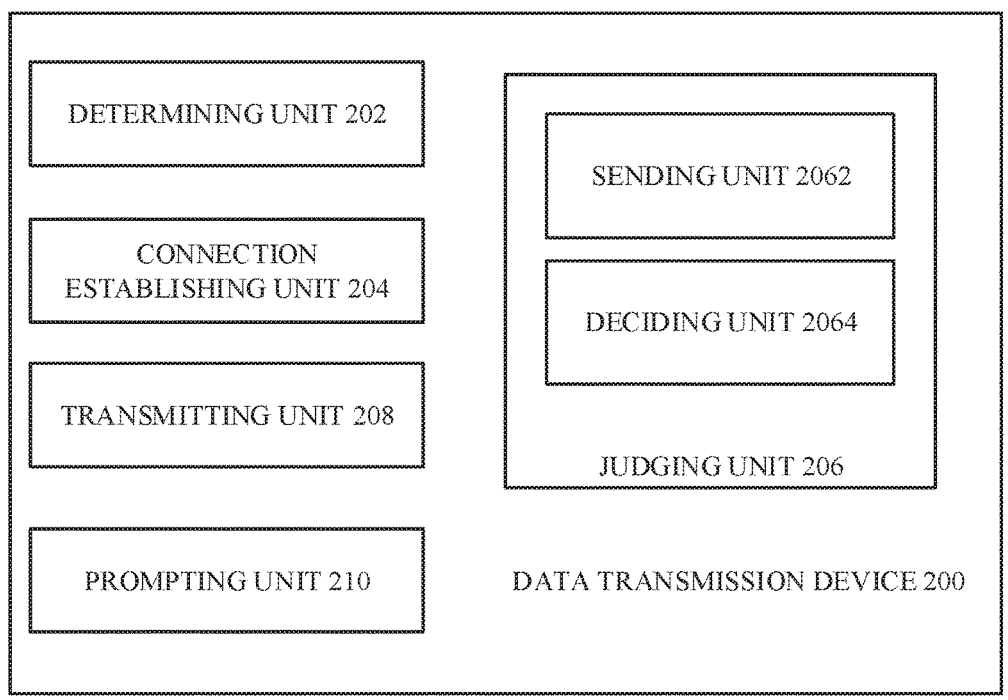
FIG. 2 is a block diagram of a data transmission device in accordance with an implementation of the present disclosure.

FIG. 2 is a block diagram of a data transmission device in accordance with an implementation of the present disclosure.

As illustrated by FIG. 2, a data transmission device 200 in accordance with an implementation of the present disclosure includes a determining unit 202 configured to determine a target transmission mode for data of a terminal when a data transmission command for transmitting the data of the terminal to a target terminal is received, wherein the target transmission mode includes a normal transmission mode and a secure transmission mode. The device 200 further includes a connection establishing unit 204 configured to switch from the current operating system of the terminal to a designated operating system of multiple operating systems when the target transmission mode is the secure transmission mode, and establish a connection with the target terminal via the designated operating system, a judging unit 206 configured to determine whether the target terminal supports secure transmission, and a transmitting unit 208 configured to transmit the data to the target terminal via the secure transmission mode when the determination result is that the target terminal supports the secure transmission.

In the technical solution, when a user of the terminal wants the data to be securely transmitted, the secure transmission mode can be selected. When the terminal detects that the transmission mode for the data is the secure transmission, and the current operating system is not the designated operating system, the user is prompted to switch to the designated operating system or the terminal automatically switches to the designated operating system. Specifically, the designated operating system can be a secure operating system. A connection with the target terminal of the receiver is then established, and whether the target terminal supports the secure transmission is determined, that is, whether the target terminal includes a secure operating system or a secure transmission module is determined. When the determination result is yes, the data is transmitted to the target terminal via the secure transmission mode, thereby ensuring data security during data transmission and after the data is transmitted to the target terminal.

In the above technical solution, preferably, the device 200 further includes a prompting unit 210 configured to prompt the user of the terminal to terminate the transmission of the data or adopt the normal transmission mode to transmit the data to the target terminal when the determination result is that the target terminal does not support the secure transmission.

In the technical solution, when the target terminal does not support the secure transmission, for ensuring security of transmission of the data, the user is prompted to terminate the transmission of the data, or to adopt the normal transmission mode to directly transmit the data.

In the above technical solution, preferably, the judging unit 206 includes a sending unit 2062 configured to send a transmission environment check command to the target terminal, so as to cause the target terminal to check whether a corresponding designated operating system is included according to the transmission environment check command, and send a support response to the terminal when the determination result is yes, and a deciding unit 2064 configured to determine whether the support response is received from the target terminal, determine that the target terminal supports the secure transmission when the determination result is yes, and determine that the target terminal does not support the secure transmission when the determination result is no.

In the technical solution, the terminal of the transmitter sends the transmission environment check command to the target terminal of the receiver, and the target terminal determines whether the target terminal includes the designated operating system according to the command, that is, whether the target terminal includes the secure operating system. The target terminal also sends the support response when the designated operating system is included, so as to inform the terminal of the transmitter that secure transmission can be performed.

In the above technical solution, preferably, the transmitting unit 208 is configured to establish a connection between a first transmission module corresponding to the designated operating system of the terminal and a second transmission module corresponding to the designated operating system of the target terminal, and transmit the data from the first transmission module to the second transmission module.

In the technical solution, when the data can be transmitted via the secure transmission mode, it indicates that the terminal of the transmitter has the designated operating system and the transmission module corresponding to the designated operating system, and the terminal of the receiver has the designated operating system and the transmission module corresponding to the designated operating system. At this point, a transmission channel is established between the two transmission modules, thereby ensuring security of transmission of the data.

Specifically, data transmission can be directly performed between the designated operating system for example the secure operating system and a designated operating system of the other terminal, for example, data is directly transmitted from a secure operating system of a terminal A to a secure operating system of a terminal B.

Furthermore, for ensuring security of the data of the terminal, the secure operating system may not be allowed to directly communicate with external devices to perform data service. At this point, when data transmission is performed, the data of the secure operating system can be transmitted to the other normal operating system of the terminal, and the data is then transmitted from the other normal operating system of the terminal to a normal operating system of an external target terminal, and then the data is transmitted from the normal operating system to a designated operating system, that is, a secure operating system.

For further ensuring security of the data, encryption processing can be performed on transmission of the data. After the target terminal of the receiver receives the data, decryption processing is performed.

In the above technical solution, preferably, the designated operating system is the operating system of the multiple operating systems having the highest security level.

In the technical solution, the operating system having the highest security level, that is, the secure operating system is set to be the designated operating system, thus the security of data transmission and data storage can be ensured.

Take a dual system terminal (normal system and secure system) for an example, the following will specifically illustrate the technical solution of the present disclosure. The "normal system" in this disclosure refers to a system for daily usage, which is unsecure or unknown to be secured or not.

Figure 3:
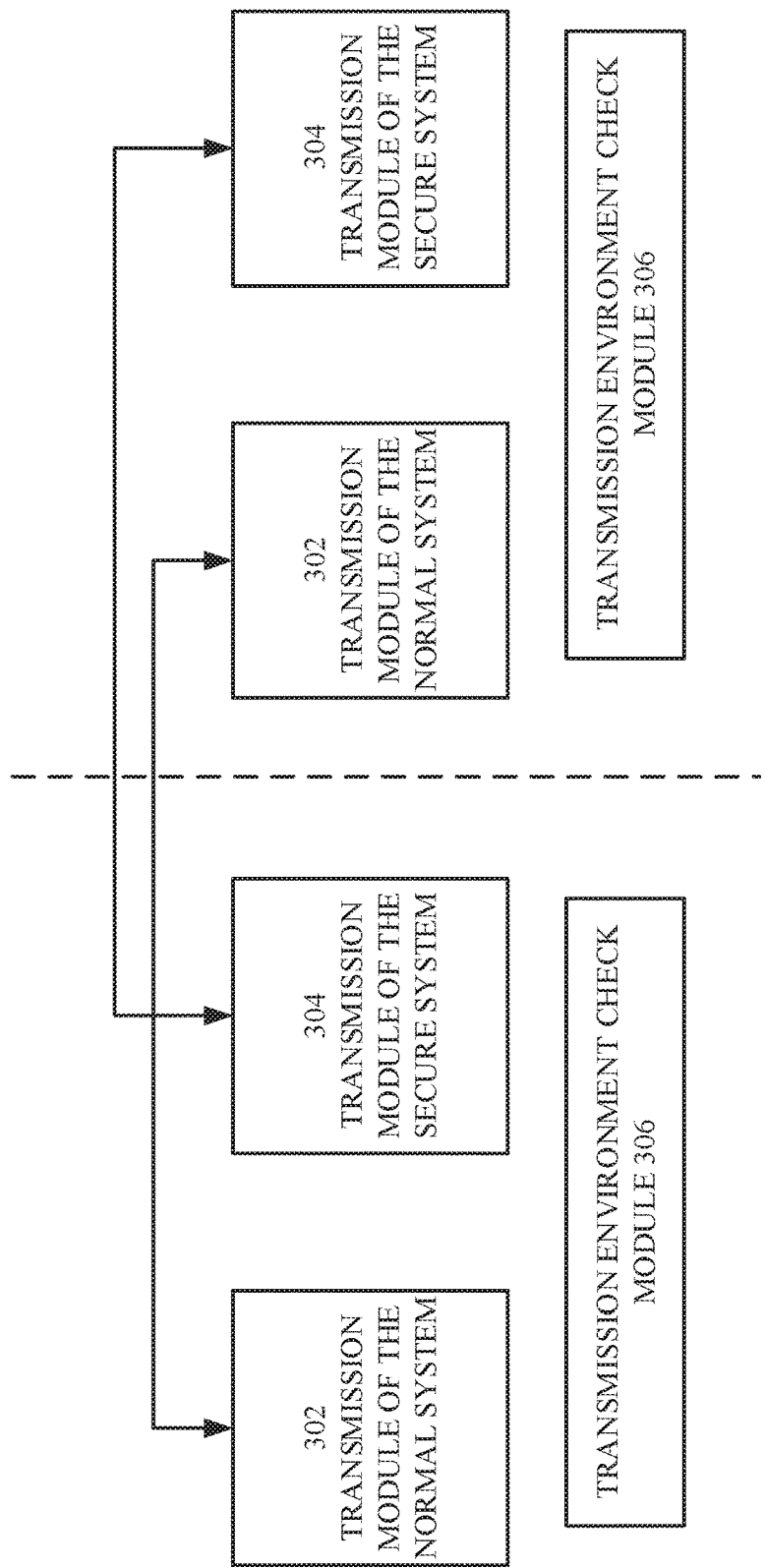
FIG. 3 is a diagrammatic view of a data transmission system in accordance with an implementation of the present disclosure.

As illustrate by FIG. 3, based on the dual systems, the terminal includes two transmission modules, that is, includes a transmission module 302 of the normal system and a transmission module 304 of the secure system. The terminal further includes a transmission environment check module 306 (equivalent to the judging unit) to check transmission environment of the terminal and the receiver. When a secure transmission function is needed by a user, the local transmission environment check module firstly checks whether the secure system is running. If not, the user is prompted to switch to the secure system, and a connection with a mobile phone of the receiver is established via the transmission module of the secure system.

After the connection is successfully established, the terminal transmits a transmission environment check command to the terminal of the receiver. If the terminal of the receiver does not include the secure transmission module, the terminal of the transmitter determines that this transmission is not a secure transmission, and prompts the user to terminate the transmission or switch to the normal transmission mode.

When the receiver includes the secure transmission module, the receiver receives the check command, and prompts the user that secure transmission information is received. Under the condition of receiving an allowance from the user, the terminal of the receiver starts current reception environment check. If the secure system is not running, the user is prompted to switch to the secure system.

After finishing security check of the two parties, a connection is established between the two parties based on the transmission modules of the secure systems, and data transmission starts. After transmission, switching to the system which is running before transmission is performed according to user intention.

If the user just wants to adopt the normal transmission mode of the normal system, the transmission can be started by directly starting the normal transmission module.

Figure 4:
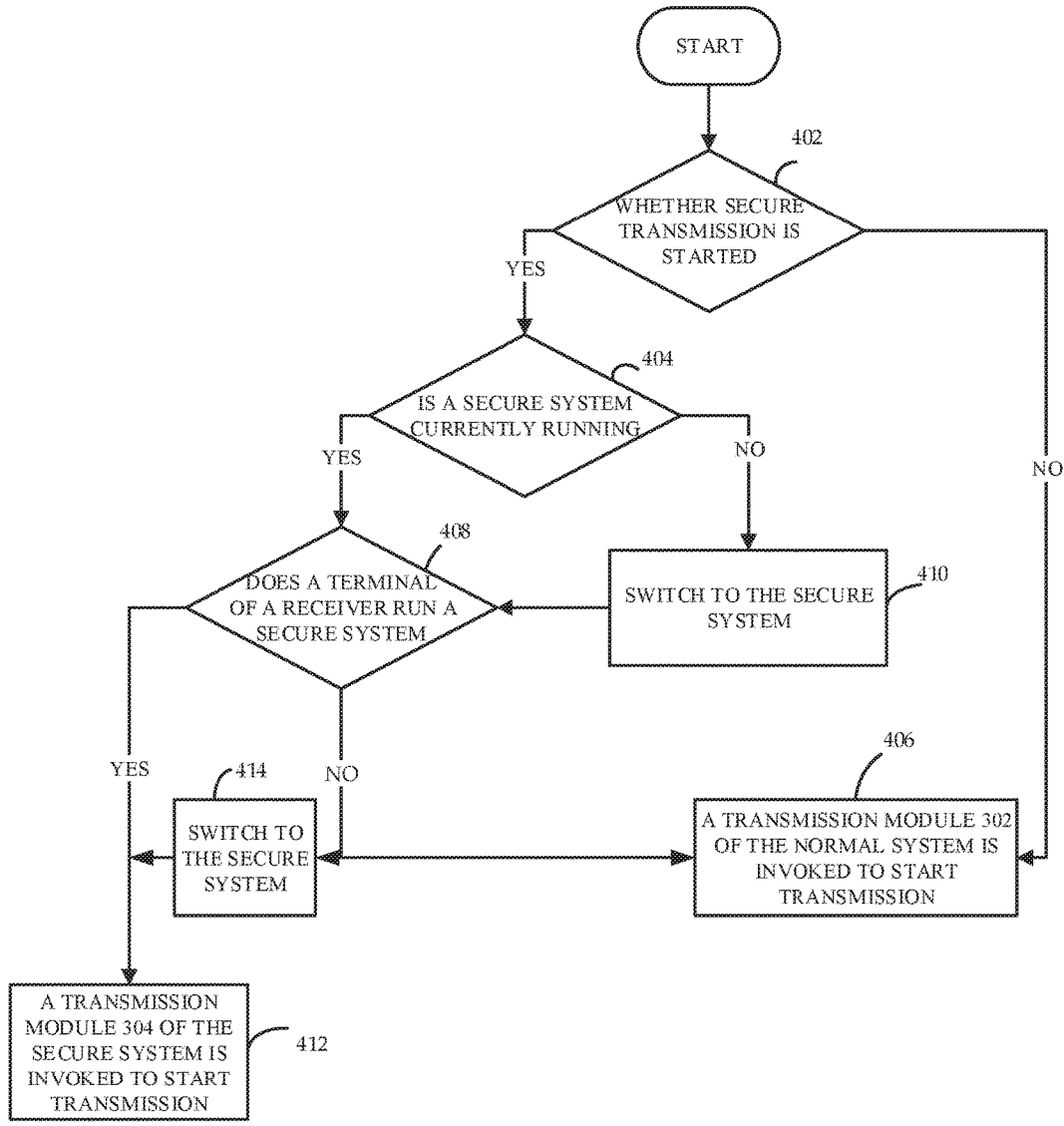
FIG. 4 is a detailed flow chart of a data transmission method in accordance with an implementation of the present disclosure.

FIG. 4 is a detailed flow chart of a data transmission method in accordance with an implementation of the present disclosure.

As illustrated by FIG. 4, a detailed process of a data transmission method in accordance with an implementation of the present disclosure includes following steps.

In step 402, whether secure transmission is started is determined. When the determination result is yes, step 404 is executed, and when the determination result is no, step 406 is executed.

In step 404, whether the terminal runs a secure system is determined. When the determination result is yes, step 408 is executed, and when the determination result is no, step 410 is executed.

In step 406, the transmission module 302 of the normal system is invoked to start the transmission process.

In step 408, whether the terminal of the receiver runs the secure system is determined. When the determination result is yes, step 412 is executed, and when the determination result is no, step 414 is executed.

In step 410, the terminal switches to the secure system.

In step 412, the transmission module 304 of the secure system is invoked to start transmission process.

In step 414, the terminal switches to the secure system.

FIG. 5 is a diagrammatic view of a terminal in accordance with an implementation of the present disclosure. The terminal includes multiple operating systems, and each operating system corresponds to a transmission module. The terminal can include but not limited to a display unit 502, a memory 503, and a processor 504. The display unit 502 and the memory 503 are electrically coupled to the processor 504.

The display unit 502 is configured to display visual information, such as text, image, for example. The display unit 502 may be a light emitting diode (LED) display screen or an organic light emitting diode (OLED) display screen.

The memory 503 is configured to store a plurality of computer-readable program codes 5031. The memory 503 can be a read only memory (ROM), a random access memory (RAM), a U-disk, a removable hard disk, etc.

The processor 504 can include multiple cores for multi-thread or parallel processing. In this implementation, the processor 504 is configured to execute the plurality of computer-readable program codes 5031 to perform following operations: determining a target transmission mode for data of the terminal when a data transmission command for transmitting the data of the terminal to a target terminal is received, wherein the target transmission mode comprises a normal transmission mode and a secure transmission mode; switching from the current operating system of the terminal to a designated operating system of the multiple operating systems when the target transmission mode is the secure transmission mode, and establish a connection with the target terminal via the designated operating system; determining whether the target terminal supports secure transmission; and transmitting the data to the target terminal via the secure transmission mode when the determination result is that the target terminal supports the secure transmission.

In an implementation, the processor 504 is further configured to invoke the plurality of computer-readable program codes 5031 to perform the following operation: prompting a user of the terminal to terminate the transmission of the data or adopt the normal transmission mode to transmit the data to the target terminal when the determination result is that the target terminal does not support the secure transmission.

In an implementation, determining whether the target terminal supports the secure transmission includes: sending a transmission environment check command to the target terminal, so as to cause the target terminal to check whether a corresponding designated operating system is comprised according to the transmission environment check command, and send a support response to the terminal when the determination result is yes; and determining whether the support response is received from the target terminal, determining that the target terminal supports the secure transmission when the determination result is yes, and determining that the target terminal does not support the secure transmission when the determination result is no.

In an implementation, transmitting the data to the target terminal via the secure transmission mode includes: establishing a connection between a first transmission module corresponding to the designated operating system of the terminal and a second transmission module corresponding to the designated operating system of the target terminal, and transmitting the data from the first transmission module to the second transmission module.

In an implementation, the designated operating system is the operating system of the multiple operating systems having the highest security level.

In the present disclosure, a machine-readable storage medium is further provided. The storage medium includes a plurality of computer readable program codes. The plurality of computer readable program codes are run in a terminal to execute the data transmission method described above. The terminal includes multiple operating systems, and each operating system corresponds to a transmission module.

The above descriptions specifically illustrate the technical solution of the present disclosure in combination with the accompanying drawings. By means of the technical solution of the present disclosure, secure transmission and storage of user secure data can be ensured, and malicious attacks from other operating systems can be avoided.

The foregoing descriptions are merely preferred implementations of the present disclosure, but are not intended to limit the present disclosure. For those skilled in the art, various changes and variations can be made according to the present disclosure. Any modifications, equivalent replacements, and improvements within the spirit and principle of the technical solution shall fall within the protection scope of the present disclosure.

What is claimed is:

1. A method for data transmission, applicable in a terminal comprising multiple operating systems with each operating system corresponding to a transmission module, the method comprising:
    determining a target transmission mode for data of the terminal when a data transmission command for transmitting the data of the terminal to a target terminal is received, wherein the target transmission mode comprises a normal transmission mode and a secure transmission mode;
    switching from a current operating system of the terminal to a designated operating system of the multiple operating systems when the target transmission mode is the secure transmission mode, and establishing a connection with the target terminal via the designated operating system;
    determining whether the target terminal supports secure transmission; and
    transmitting the data to the target terminal via the secure transmission mode based on a determination that the target terminal supports the secure transmission.

2. The method of claim 1, wherein the method further comprises:
    prompting a user of the terminal to terminate the transmitting of the data or to adopt the normal transmission mode to transmit the data to the target terminal based on a determination that the target terminal does not support the secure transmission.

3. The method of claim 1, wherein determining whether the target terminal supports the secure transmission comprises:
    sending a transmission environment check command to the target terminal to cause the target terminal to:
        determine whether the target terminal comprises a corresponding designated operating system according to the transmission environment check command, and
        send a support response to the terminal when the target terminal comprises the corresponding designated operating system; and
    determining whether the support response is received from the target terminal, determining that the target terminal supports the secure transmission when the support response is received from the target terminal, and determining that the target terminal does not support the secure transmission when the support response is not received from the target terminal.

4. The method of claim 3, wherein transmitting the data to the target terminal via the secure transmission mode comprises:
    establishing a connection between a first transmission module corresponding to the designated operating system of the terminal and a second transmission module corresponding to the designated operating system of the target terminal, and transmitting the data from the first transmission module to the second transmission module.

5. The method of claim 1, wherein the designated operating system comprises an operating system of the multiple operating systems having the highest security level.

6. A terminal having multiple operating systems with each operating system corresponding to a transmission module, the terminal comprising:
    a memory storing a plurality of computer-readable program codes; and
    a processor configured to invoke the plurality of computer-readable program codes to:
        determine a target transmission mode for data of the terminal when a data transmission command for transmitting the data of the terminal to a target terminal is received, wherein the target transmission mode comprises a normal transmission mode and a secure transmission mode;
        switch from a current operating system of the terminal to a designated operating system of the multiple operating systems when the target transmission mode is the secure transmission mode, and establish a connection with the target terminal via the designated operating system;
        determine whether the target terminal supports secure transmission; and
        transmit the data to the target terminal via the secure transmission mode based on a determination that the target terminal supports the secure transmission.

7. The terminal of claim 6, wherein the processor is further configured to invoke the plurality of computer-readable program codes to:
    prompt a user of the terminal to terminate the transmitting the data or adopt the normal transmission mode to transmit the data to the target terminal based on a determination that the target terminal does not support the secure transmission.

8. The terminal of claim 6, wherein when determining whether the target terminal supports the secure transmission, the processor is further configured to:
- send a transmission environment check command to the target terminal to cause the target terminal to:
  - determine whether the target terminal comprises a corresponding designated operating system according to the transmission environment check command; and
  - send a support response to the terminal the target terminal comprises the corresponding designated operating system; and
- determine whether the support response is received from the target terminal, determine that the target terminal supports the secure transmission when the support response is received from the target terminal, and determine that the target terminal does not support the secure transmission when the support response is received from the target terminal.

9. The terminal of claim 8, wherein when transmitting the data to the target terminal via the secure transmission mode, the processor is further configured to:
- establish a connection between a first transmission module corresponding to the designated operating system of the terminal and a second transmission module corresponding to the designated operating system of the target terminal; and
- transmit the data from the first transmission module to the second transmission module.

10. The terminal of claim 6, wherein the designated operating system comprises an operating system of the multiple operating systems having the highest security level.

11. A non-transitory machine-readable storage medium storing a plurality of computer-readable program codes for a terminal comprising multiple operating systems with each operating system corresponding to a transmission module, the plurality of computer-readable program codes being invoked by the terminal to:
- determine a target transmission mode for data of the terminal when a data transmission command for transmitting the data of the terminal to a target terminal is received, wherein the target transmission mode comprises a normal transmission mode and a secure transmission mode;
- switch from a current operating system of the terminal to a designated operating system of the multiple operating systems when the target transmission mode is the secure transmission mode, and establish a connection with the target terminal via the designated operating system;
- determine whether the target terminal supports secure transmission; and
- transmit the data to the target terminal via the secure transmission mode based on a determination that the target terminal supports the secure transmission.

12. The non-transitory machine-readable storage medium of claim 11, further comprising program codes to:
- prompt a user of the terminal to terminate the transmitting the data or adopt the normal transmission mode to transmit the data to the target terminal based on a determination that the target terminal does not support the secure transmission.

13. The non-transitory machine-readable storage medium of claim 11, wherein the program codes to determine whether the target terminal supports the secure transmission further comprise program codes to:
- send a transmission environment check command to the target terminal to cause the target terminal to
  - check whether the target terminal comprises a corresponding designated operating system according to the transmission environment check command, and
  - send a support response to the terminal when the target terminal comprises the corresponding designated operating system; and
- determine whether the support response is received from the target terminal, determine that the target terminal supports the secure transmission when the support response is received from the target terminal, and determine that the target terminal does not support the secure transmission when the support response is received from the target terminal.

14. The non-transitory machine-readable storage medium of claim 13, wherein the program codes to transmit the data to the target terminal via the secure transmission mode further comprise program codes to:
- establish a connection between a first transmission module corresponding to the designated operating system of the terminal and a second transmission module corresponding to the designated operating system of the target terminal; and
- transmit the data from the first transmission module to the second transmission module.

15. The non-transitory machine-readable storage medium of claim 11, wherein the designated operating system comprises an operating system of the multiple operating systems having the highest security level.

\* \* \* \* \*